US008799605B2

(12) United States Patent
Hasegawa

(10) Patent No.: US 8,799,605 B2
(45) Date of Patent: Aug. 5, 2014

(54) INITIALIZING AND WRITING TO A NONVOLATILE STORAGE DEVICE BASED ON A CLIENT/SERVER MODEL

(75) Inventor: Misao Hasegawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 13/426,872

(22) Filed: Mar. 22, 2012

(65) Prior Publication Data

US 2013/0073839 A1 Mar. 21, 2013

(30) Foreign Application Priority Data

Sep. 20, 2011 (JP) ................................. 2011-205193

(51) Int. Cl.
*G06F 12/08* (2006.01)
*G06F 9/445* (2006.01)
*G06F 9/44* (2006.01)

(52) U.S. Cl.
CPC .......... *G06F 12/0804* (2013.01); *G06F 9/4411* (2013.01)
USPC .................... 711/166; 711/103; 711/E12.008

(58) Field of Classification Search
CPC .. G06F 12/0804; G06F 9/4401; G06F 9/4411
USPC ............................ 711/103, 154, 166, E12.008
See application file for complete search history.

(56) References Cited

U.S. PATENT DOCUMENTS

| 7,926,720 | B2 | 4/2011 | Elhamias et al. | |
|---|---|---|---|---|
| 2007/0184719 | A1* | 8/2007 | Ni et al. | 439/610 |
| 2009/0307427 | A1 | 12/2009 | Takasuka et al. | |
| 2010/0122017 | A1* | 5/2010 | Toyama | 711/103 |
| 2010/0268869 | A1* | 10/2010 | Roh et al. | 711/103 |
| 2011/0055422 | A1* | 3/2011 | Simcoe et al. | 709/236 |
| 2011/0231599 | A1* | 9/2011 | Kawamura et al. | 711/103 |

FOREIGN PATENT DOCUMENTS

| JP | 2001-109582 | 4/2001 |
|---|---|---|
| JP | 2004-064665 | 2/2004 |
| JP | 2010-287203 | 12/2010 |
| WO | WO 2007/116476 A1 | 10/2007 |
| WO | WO 2008/013227 A1 | 1/2008 |

OTHER PUBLICATIONS

JEDEC Standard, Universal Flash Storage (UFS), JESD220, JEDEC Solid State Technology Association, Feb. 2011. 129 pages.
Office Action mailed Feb. 4, 2014 in Japanese Patent Application No. 2011-205193 filed Sep. 20, 2011 (with English Translation).

* cited by examiner

*Primary Examiner* — Hal Schnee
(74) *Attorney, Agent, or Firm* — Oblon, Spivak, McClelland, Maier & Neustadt, L.L.P.

(57) ABSTRACT

According to one embodiment, a memory device includes a nonvolatile memory including a plurality of memory cells, and a controller configured to control the nonvolatile memory. At a time of a boot operation, when a request for initialization of the memory device is issued, the controller does not return a response to the request until completion of the initialization, and the controller returns a response to the request when the initialization is completed.

8 Claims, 9 Drawing Sheets

Boot sequence example (Reference example)

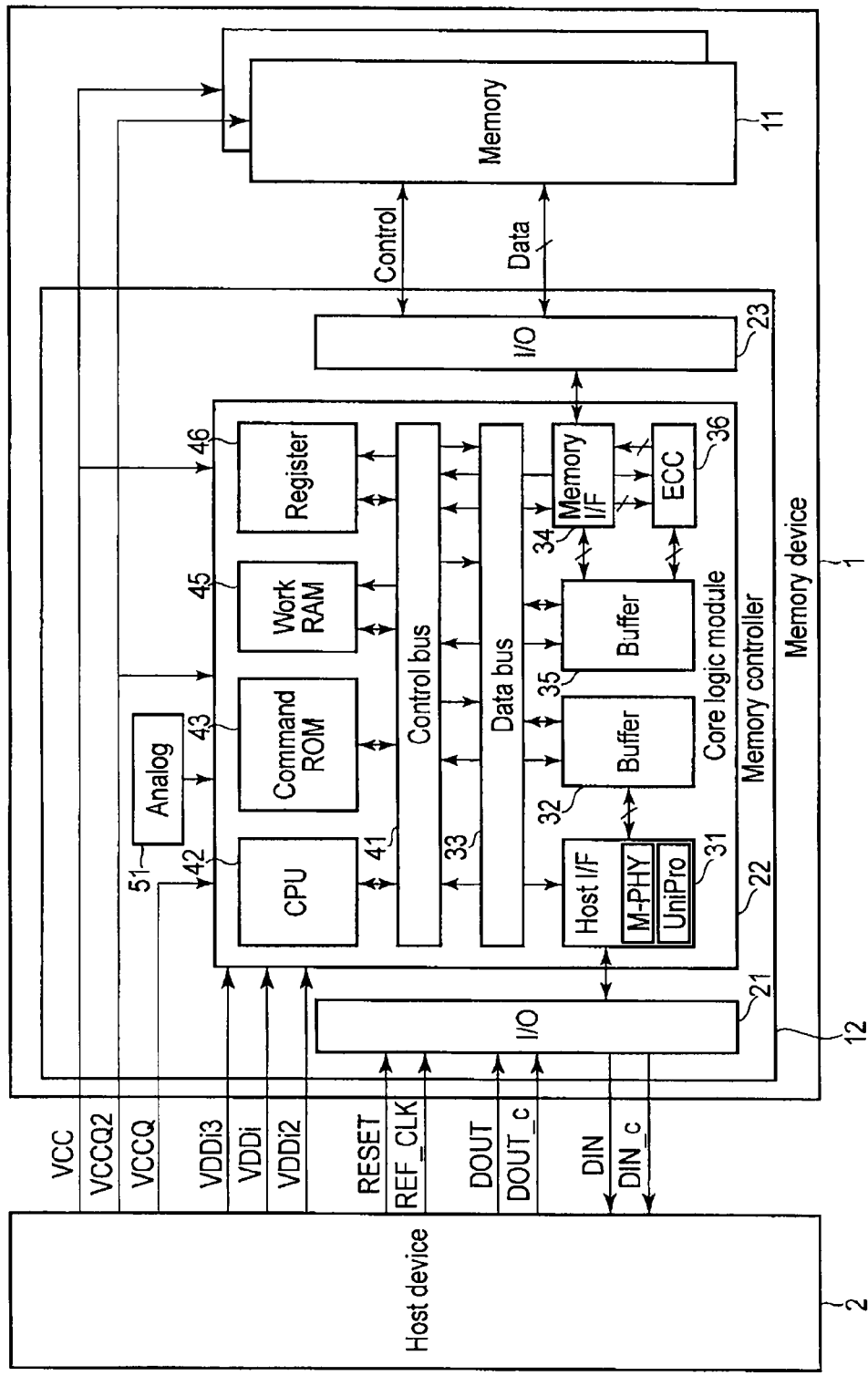
F I G. 3

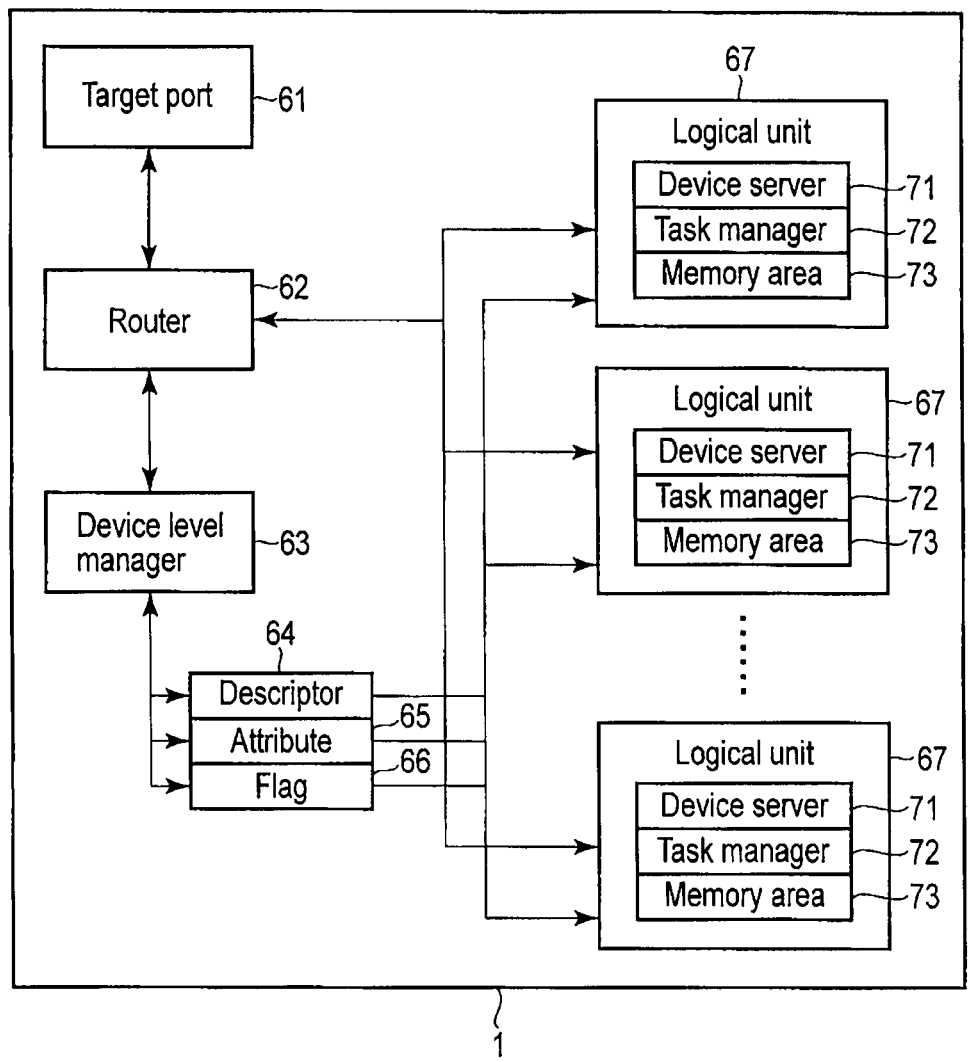
F I G. 5

| Logical address | Physical (block) address |
|---|---|
| 0x0000_0x0FFF | 0x0001 |
| 0x1000_0x1FFF | 0x0005 |
| 0x2000_0x2FFF | 0x0100 |
| 0x3000_0x3FFF | 0x0A00 |
| 0x4000_0x4FFF | 0x0003 |
| 0x5000_0x5FFF | 0x0123 |
| ... | ... |

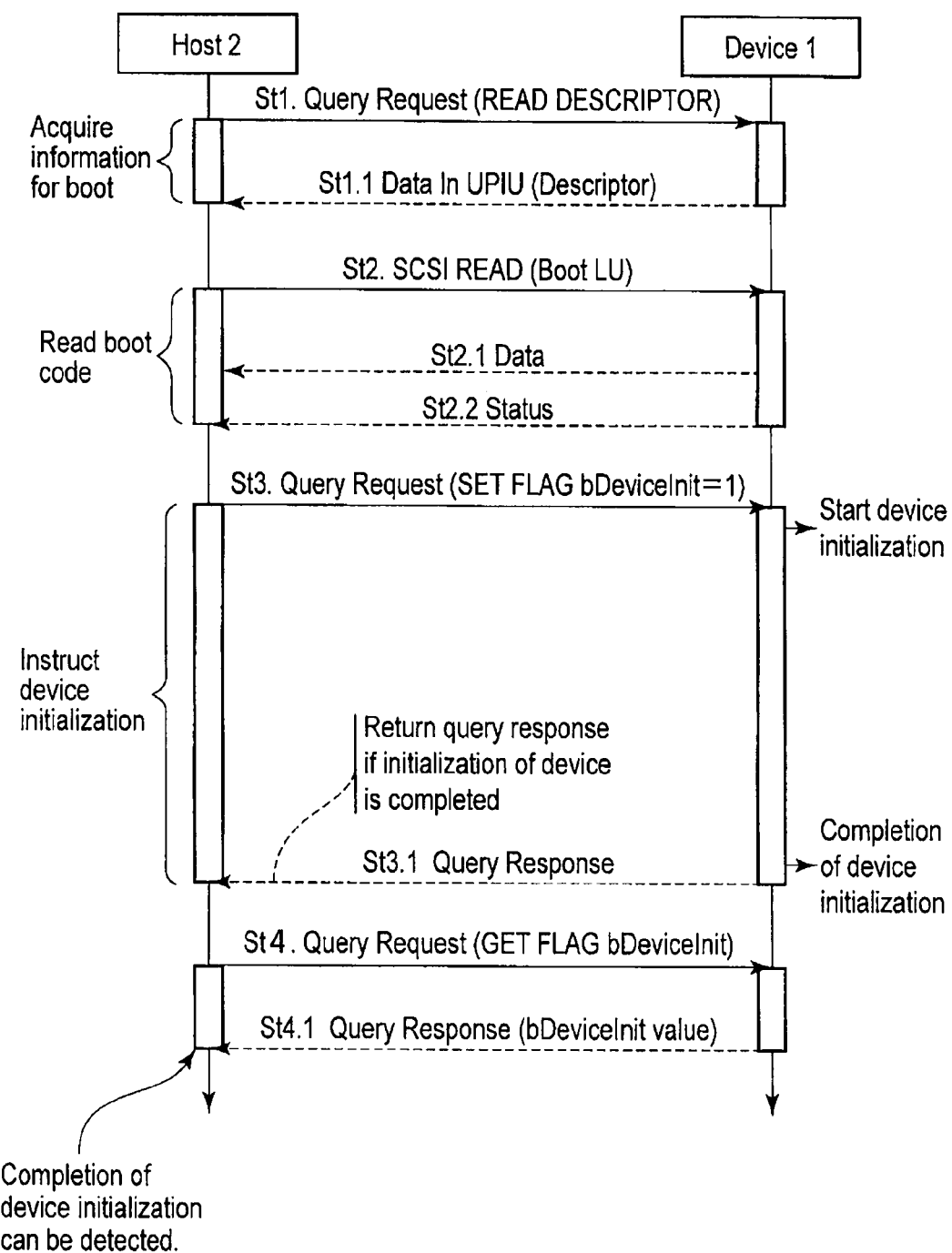
F I G. 9

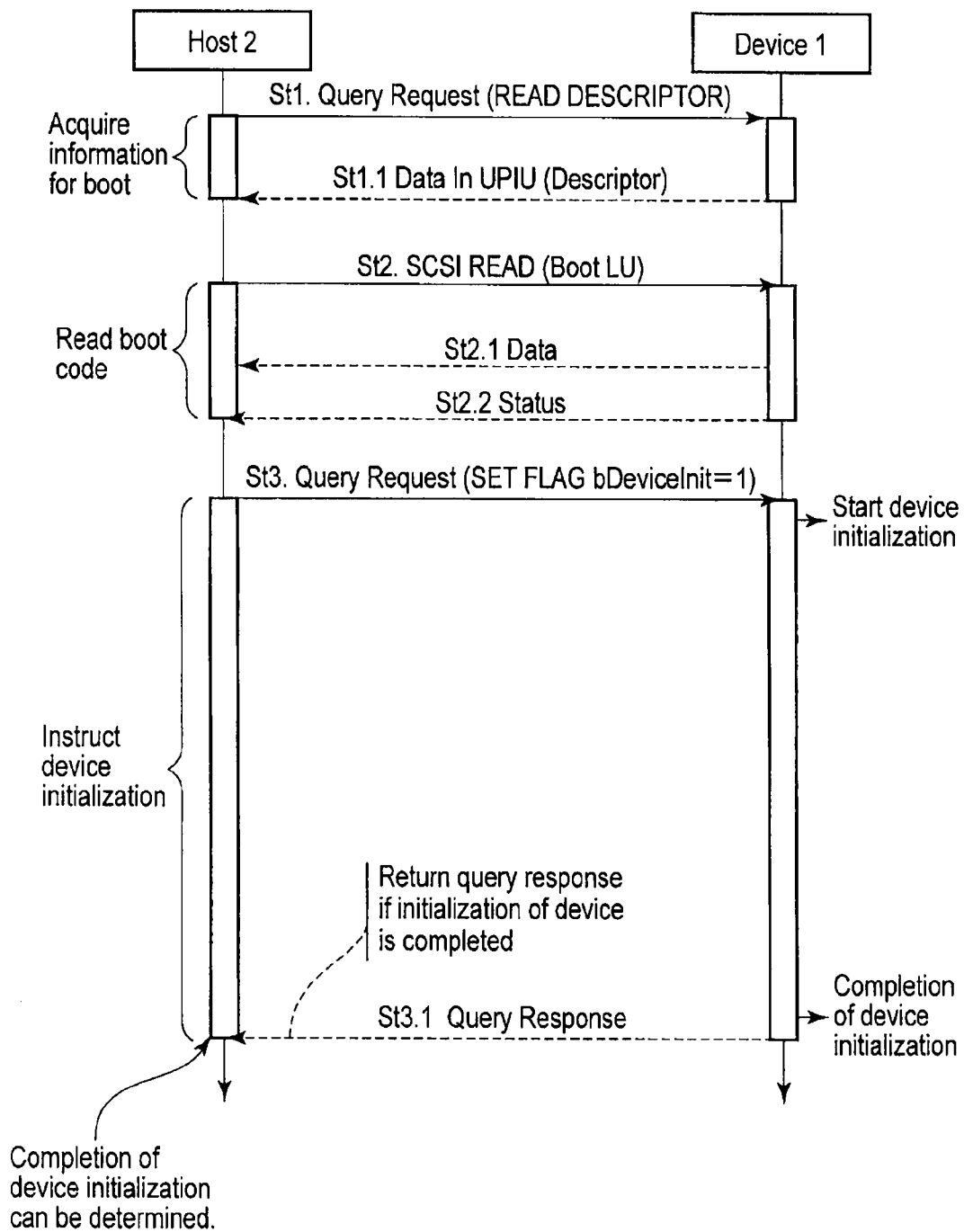
F I G. 10

INITIALIZING AND WRITING TO A NONVOLATILE STORAGE DEVICE BASED ON A CLIENT/SERVER MODEL

CROSS-REFERENCE TO RELATED APPLICATIONS

This application is based upon and claims the benefit of priority from prior Japanese Patent Application No. 2011-205193, filed Sep. 20, 2011, the entire contents of which are incorporated herein by reference.

FIELD

Embodiments described herein relate generally to a memory device and a host device.

BACKGROUND

There are various kinds of media which store data. Such media include, for instance, a memory device based on a client/server model. A memory system, which is composed of a memory device and a host device based on the client/server model, is different from other memory systems in some points. For example, the assignment of roles to the memory device and host device based on the client/server model is different from the assignment of roles to a memory device and a host device which are not based on the client/server model. Accordingly, the contents of communications between the host device and memory device differ between the system based on the client/server model and the system not based on the client/server model.

In some cases, a memory system accords with a specific standard. An example of the memory system based on the client/server model is a UFS (Universal Flash Storage) memory device and host device. As regards points specified in the standard, the memory system must accord with specifications. However, there are points which are not specified in the standard, and a designer of the memory system can decide on such points. Such items with a degree of freedom should be determined so that desirable capabilities may be realized in a manner to adapt to the characteristics of the memory system. There has been a demand that a memory device, which can realize higher capabilities, be provided by making proper decisions on such matters with a degree of freedom.

BRIEF DESCRIPTION OF THE DRAWINGS

FIG. 3 is a block diagram illustrating a hardware structure of a memory device according to a first embodiment;

FIG. 5 is a view illustrating functional blocks of the memory device according to the first embodiment;

FIG. 9 is a flow chart illustrating a boot (Boot) sequence example according to the first embodiment; and FIG. 10 is a flow chart illustrating a boot (Boot) sequence example according to a second embodiment.

DETAILED DESCRIPTION

In general, according to one embodiment, a memory device includes a nonvolatile memory including a plurality of memory cells; and a controller configured to control the nonvolatile memory. At a time of a boot operation, when a request for initialization of the memory device is issued, the controller does not return a response to the request until completion of the initialization, and the controller returns a response to the request when the initialization is completed. In response to a request from a host device to write, in the memory, write data to which logical addresses are allocated, the controller requests the host device to transmit a write data part, which is a divided part of the write data, with a size of the write data part being designated.

REFERENCE EXAMPLE

Prior to the description of embodiments, a reference example will be described in brief with reference to FIG. 1 and FIG. 2.

Figure 1:
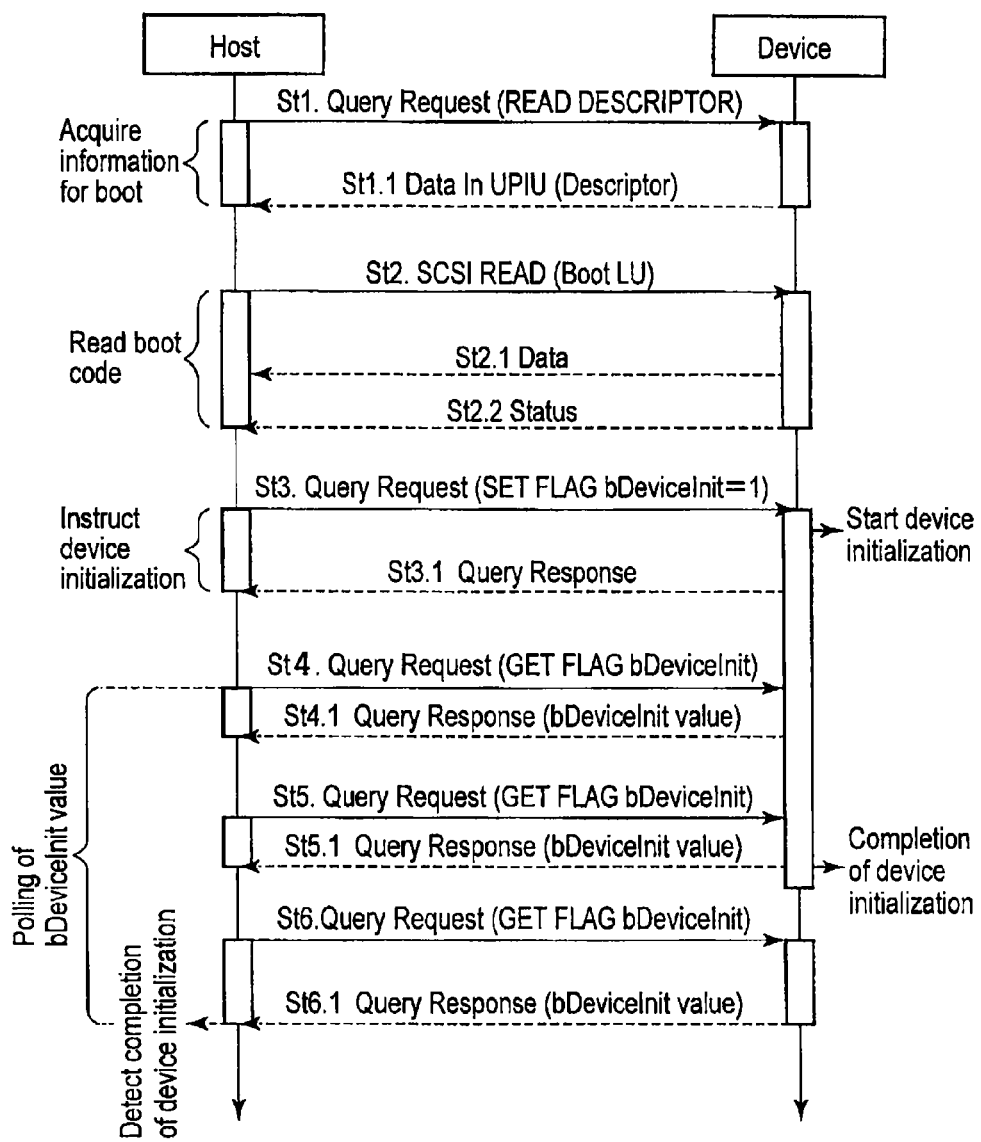
FIG. 1 is a flow chart illustrating a boot (Boot) sequence example according to a reference example.

FIG. 1 is a flow chart illustrating a boot (Boot) sequence example in a Universal Flash Memory (UFS).

As shown in FIG. 1, in steps St1 to St2.2, a host and a device execute an operation which is necessary for device initialization.

Then, in step St3, the host issues a query request (Query Request) to the device, and instructs the start of initialization. At this time, the host sets bpeviceInit='1' as a flag value via a UFS protocol information unit ("UPIU").

Subsequently, in step St3.1, the device starts the device initialization and returns a query response (Query Response) to the host.

Then, in step St4, the host issues a query request to the device and inquires, via the UPIU, whether the initialization of the device has been completed or not.

In response, in step St4.1, the device returns a query response to the host, indicating a state as to whether the initialization of the device has been completed or not.

Then, in step St5, the host similarly issues a query request to the device and inquires, via the UPIU, whether the initialization of the device has been completed or not.

In response, in step St5.1, the device similarly returns a query response to the host, indicating a state as to whether the initialization of the device has been completed or not.

Then, in step St6, the host similarly issues a query request to the device and inquires, via the UPIU, whether the initialization of the device has been completed or not.

In response, in step St6.1, the device similarly returns a query response to the host, and indicates that the initialization of the device has been completed. At this time, the device sets bDeviceInit='0' as a flag value via the UPIU.

Upon receiving the query response, the host detects that the initialization of the device has been completed, and terminates the boot process.

As has been described above, in the reference example, the host has to wait to completion of initialization while executing polling (polling with bDeviceInit='1'). To be more specific, in the reference example, after instructing the initialization of the device, the host side inquires three times about the completion of initialization by the query requests, and the host side recognizes the completion of the initialization by the third inquiry. Specifically, while the host is executing the polling, the host side needs to allocate resources for the monitoring of the device side.

Figure 2:
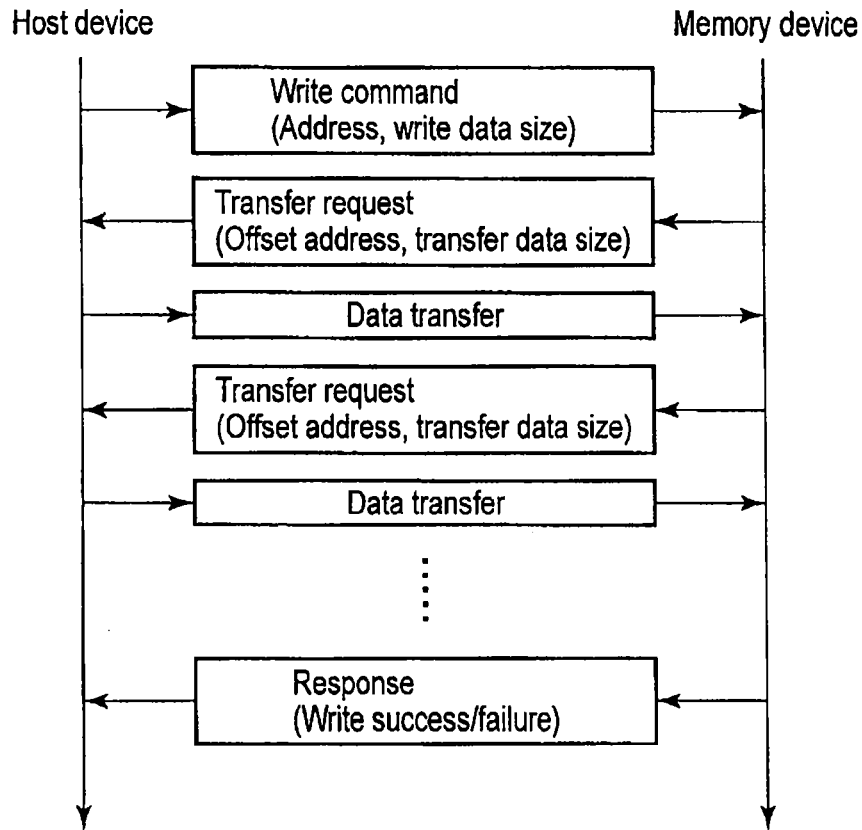
FIG. 2 is a view illustrating an example of communication between a memory device and a host device, which are based on a client/server model according to the reference example, at a time of writing data.

Next, referring to FIG. 2, a description is given of an example of communication between a memory device and a host device, which are based on the client/server model at a time of writing data.

As shown in FIG. 2, the host device starts data write by issuing a write command. The write command includes a logical address designating a position of data write, and information indicative of the size of write data which is a target of the write command. Upon receiving the write command, the memory device determines the content of a transfer request for the write data. The transfer request includes the size of that part of the write data, which the memory device desires the host device to transfer, and an offset address. The offset address is an address for specifying the position of the data part, the transfer of which is desired by the memory device. Upon receiving the transfer request, the host device transfers the requested data part to the memory device. The memory device executes write of the received data part, and transmission of a transfer request for other data parts. The data write and transfer request are continued until the whole write data has been written. In accordance with the success/failure of write of the whole write data, the memory device transmits a corresponding response to the host device.

In this manner, in the example of FIG. 2, the memory device determines the write data part, and transmits the transfer request. As regards the data write, there are matters which are specified by the standard and matters which are not specified by the standard. For example, whether offset addresses in the transfer request by the memory device are sequential or random is arbitrarily set in the host device, and the selection of offset addresses must agree with this setting. On the other hand, for example, there is a case in which the size of the data part designated by the transfer request is not specified in the specifications.

An SD™ card and an eMMC are examples of the memory device which is not based on the client/server model.

Next, embodiments, which are constructed based on the above knowledge, will be described with reference to the accompanying drawings. In the description below, structural elements having substantially the same function and structure are denoted by like reference numerals, and an overlapping description is given only where necessary. The following embodiments illustrate, by way of example, a device and a method for embodying the technical concept of these embodiments, and the technical concept does not specify the material, shape, structure or configuration of structural components. Various changes and modifications can be made to the technical concept of the embodiments, without departing from the scope of the claims.

First Embodiment

Next, a first embodiment is described.

FIG. 3 schematically illustrates a memory device according to the first embodiment. FIG. 3 shows a hardware structure of the memory device.

As shown in FIG. 3, the memory device 1 is configured to be able to communicate with a host device (hereinafter, in some cases, referred to simply as "host") 2. The memory device 1 and host 2 communicate, at least in such a manner that the memory device 1 can designate the size and position of a part of write data in response to a write request from the host 2. For example, in response to a request from the host device 2 to write in a memory the write data to which logical addresses are allocated, the memory device 1 can request the host device 2 to transmit a write data part, which is a divided part of the write data, with the size of the write data part being designated. To be more specific, the memory device 1 and host 2 communicate, based on a client/server model. The memory device 1 operates as a target, and the host 2 operates as an initiator. In a more concrete example, the memory device 1 is a UFS memory device, and the host 2 is a host which supports the UFS memory device.

The memory device 1 includes, at least, a nonvolatile semiconductor memory 11, and a memory controller 12 for controlling the memory 11. The memory 11 executes data write and data read in units of a specific write unit comprising a plurality of bits. Further, the memory 11 executes data erase in units of an erase unit comprising a plurality of write units.

For example, the memory 11 is composed of one or plural NAND flash memories. When the memory 11 is a NAND flash memory, the memory 11 executes data write and read in units of a page. The page is composed of a memory space of a set of a plurality of memory cells whose gates are commonly coupled, and a unique physical address is allocated to the page. In addition, in the case where the memory 11 is a NAND flash memory, the memory 11 executes data erase in units of a block. Each block comprises a plurality of pages having sequential physical addresses. Each of the memory cells is composed of a MOSFET (metal oxide semiconductor field effect transistor) having a stacked gate. In each of cell transistors, a threshold voltage varies in accordance with the number of electrons accumulated in a floating gate, and each cell transistor stores information corresponding to the threshold voltage. In the case where the memory 11 is the NAND flash memory, the cell transistor can take different states according to two or more threshold voltages. Specifically, the memory 11 may be configured such that the memory cell may store multiple values (multi-bits). In the description below, for the purpose of convenience, it is assumed that the write unit is a page and the erase unit is a block. However, the memory 11 is not necessarily limited to the NAND flash memory.

The memory device 1 includes an I/O 21, a core logic module 22, and an I/O 23. The I/O 21 includes a hardware structure for the memory device 1 to establish a connection to the host 2. In the case where the memory device 1 is the UFS memory device, signals between the memory device 1 and the host 2 include RESET, REF_CLK, DOUT, DOUT_c, DIN, DIN_c, VCC, VCCQ, VCCQ2, VDDi, VDDi2, and VDDi3. The RESET, REF_CLK, DOUT, DOUT_c, DIN, and DIN_c are communicated between the host 2 and the I/O 21. The RESET is a hardware reset signal. The REF_CLK is a reference clock. The DOUT and DOUT_c constitute a differential signal pair, and are signals which are sent from the host 2 to the memory device 1. The DIN and DIN_c constitute a differential signal pair, and are signals which are sent from the memory device 1 to the host 2. The VCC, VCCQ and VCCQ2 are power supply voltages which are supplied to the memory 11 and the core logic module 22. The VDDi, VDDi2, and VDDi3 are supplied to the core logic module 22, and serve as an input terminal in a case where a voltage regulator is provided in the core logic module 22.

The core logic module 22 is a main part of the memory controller 12, excluding the I/O. The I/O 23 includes a hardware structure for the memory controller 12 to establish a connection to the memory 11. The core logic module 22 includes a host interface 31, a buffer 32, a data bus 33, a memory interface 34, a buffer 35, an ECC circuit 36, a control bus 41, a CPU (central processing unit) 42, a ROM (read only memory) 43, a work RAM (random access memory) 45, and a register 46.

The I/O 21 is connected to the host interface 31. The host interface 31 executes a process which is necessary for communication between the memory device 1 and the host 2. To be more specific, the host interface 31 functions for communication between the memory device 1 and the host 2 according to the communication protocol which is supported by both the memory device 1 and the host 2. In the case where the memory device 1 is the UFS memory device, the host interface 31 is, for instance, a UFS interface. The UFS interface accords with the M-PHY standard with respect to a physical layer, and accords with the UniPro standard with respect to a link layer.

The host interface 31 is connected to the buffer 32. The buffer 32 receives, via the host interface 31, data which has been transmitted from the host 2 to the memory device 1, and temporarily stores this data. In addition, the buffer 32 temporarily stores data which is transmitted from the memory device 1 to the host 2 via the host interface 31. The buffer 32 is connected to the data bus 33.

The I/O 23 is connected to the memory interface 34. The memory interface 34 executes a process which is necessary for the memory controller 12 to communicate with the memory 11. To be more specific, the memory interface 34 transmits an instruction from the core logic module 22 in such a form that the instruction can be recognized by the memory 11. When the memory 11 is a NAND flash memory, the memory interface 34 is a NAND flash interface.

The memory interface 34 is connected to the buffer 35. The buffer 35 receives, via the memory interface 34, data which has been transmitted from the memory 11 to the controller 12, and temporarily stores this data. In addition, the buffer 35 temporarily stores data which is to be transmitted from the controller 12 to the memory 11 via the memory interface 34. The memory interface 34 and buffer 35 are connected to the ECC (error correcting code) circuit 36. The ECC circuit 36 is connected to a data buffer 24. The ECC circuit 36 receives write data from the host 1 via the data bus 33, adds an error correcting code to the write data, and delivers the write data, to which the error correcting code has been added, to the buffer 35. In addition, the ECC circuit 36 receives data, which has been delivered from the memory 11, via the buffer 35, executes error correction of this data by using an error correcting code, and delivers the error-corrected data to the data bus 33.

The data bus 33 is connected to the control bus 41. The CPU 42, ROM 43, RAM 45 and register 46 are connected to the control bus 41. The CPU 42, ROM 43, RAM 45 and register 46 communicate with each other via the control bus 41. The CPU 42 controls the overall operation of the memory device 1. The CPU 42 executes a predetermined process according to a control program (commands) stored in the ROM 43. The CPU 42 executes, for example, a predetermined process for the memory 11 according to commands which are received from the host 2 according to the control program.

The ROM 43 stores, e.g. a control program which is controlled by the CPU 42. The RAM 45 is used as a work area of the CPU 42, and temporarily stores, for instance, variables which are necessary for the work of the CPU 42. The register 46 stores various values which are necessary for the operation of the memory device 1. In addition, the register 46 stores various values which are necessary for the host 2 to control the memory device 2.

The host interface 31, buffer 32, memory interface 34 and buffer 35 are connected to the control bus 41. Based on the control program and instructions from the host 2, the CPU 42 controls the host interface 31, buffer 32, memory interface 34 and buffer 35. An analog port circuit 51 may be provided in the memory controller 12.

<Re: Packaged Form of Memory Device>

The memory device 1 may be, for example, an embedded-type memory device which is mounted on a printed circuit board by soldering, or a removable-type memory device which can be inserted in and detached from a card slot which is provided in the host 2.

Figure 4:
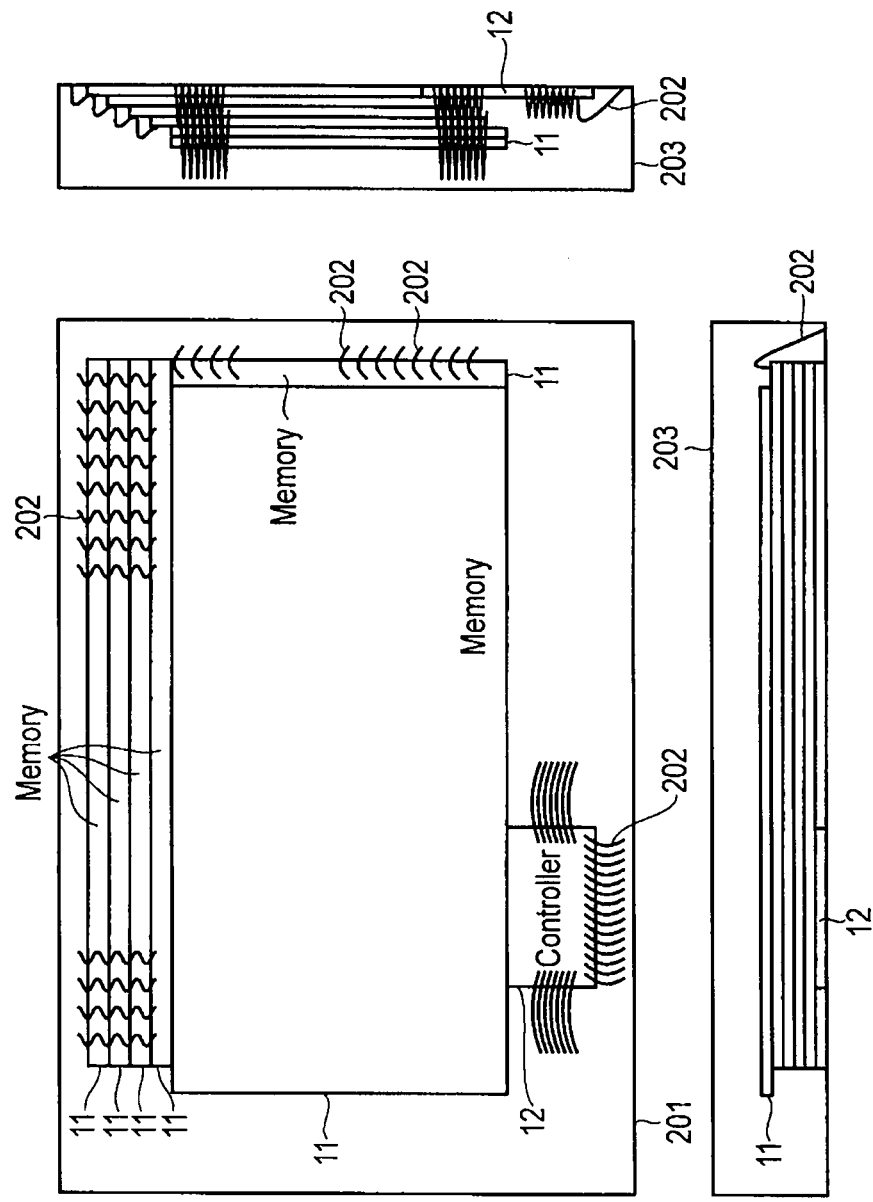
FIG. 4 is a view illustrating an example of the memory device in a sealed form in the first embodiment.

FIG. 4 illustrates an example of the packaged memory device 1 by, for example, sealed resin. As shown in FIG. 4, a plurality of memories in chip-form 11 are stacked on a printed circuit board 201. Each memory 11 is connected to a circuit pattern (not shown) on the printed circuit board 201 by wires 202. A controller in chip-form 12 is also disposed on the printed circuit board 201, and is connected to the circuit pattern by wires 202. For example, external terminals (e.g. BGA (ball grid array)) (not shown) are provided on a back side of the printed circuit board 201. The signals shown in FIG. 4 (RESET, REF_CLK, DOUT, DOUT_c, DIN, DIN_c, VCC, VCCQ, VCCQ2, VDDi, VDDi2, and VDDi3) are allocated to the external terminals. Signals are communicated between the memory device 1 and the host 2 on the outside of the memory device 1 via the external terminals. The printed circuit board 201, memories 11, memory controller 12 and wires 202 are packaged by, for example, a resin 203.

<Re: Functional Blocks of Memory Device>

Next, FIG. 5 shows another aspect of the structure of the memory device 1. To be more specific, FIG. 5 shows a logical structure of the memory device 1, that is, functional blocks of the memory device 1. Each of the functional blocks can be realized by hardware, computer software, or a combination of hardware and computer software. Whether each functional block is to be executed as hardware or to be executed as software depends on a concrete mode of implementation or on design restrictions imposed on the entire system. A person skilled in the art may realize these functions by various methods in each concrete mode of implementation, but all methods for realization fall within the scope of the present invention. Besides, it is not imperative that the respective functional blocks are distinguished as in a concrete example which will be described below. For example, some functions may be executed by functional blocks which are different from the functional blocks illustrated in the description below. Furthermore, the illustrated block may be divided into functional sub-blocks. The embodiment is not restricted according to which blocks specify which functions.

As shown in FIG. 5, the memory device 1 includes a target port 61, a router 62, a device level manager 63, a descriptor 64, an attribute 65, a flag 66, and a plurality of logical units (LU) 67.

The target port 61 is a port by which the memory device 1 is communicably connected to the host 2. For example, the target port 61 corresponds to the host interface 31. The router 62 executes routing of a communication (e.g. task, command, data, or query) from the host 2 to a destination LU 67. The host 2 requests a command process or a task management function, by setting one LU 67 to be a destination.

Figures 6, 7:
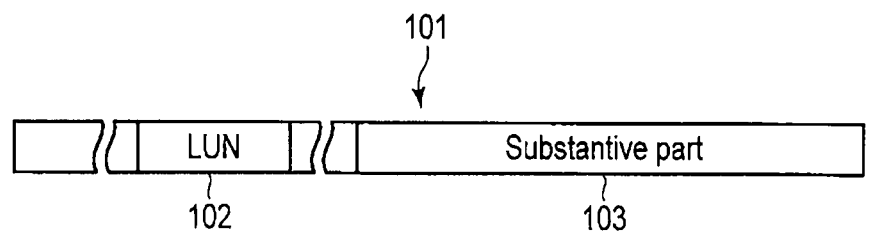
FIG. 6 is a view illustrating an example of a packet relating to the first embodiment.
FIG. 7 is a view illustrating an example of a conversion table of logical addresses and physical blocks.

The respective LUs 67 can mutually be identified by addresses (e.g. LUN (logical unit number)). For example, as shown in FIG. 6, the LUN can be included in a communication (packet) between the memory device 1 and the host 2. As shown in FIG. 6, a packet 101 includes a LUN 102 and a substantive part 103. The LUN 102 can be included in, for example, a header of the packet 101. The substantive part 103 includes contents which are unique to the function of the packet, such as a command, data or various parameters. The LU 62, which is the destination of each packet, is uniquely specified by the LUN. In the UFS memory device, each of packets between the memory device 1 and host 2 includes a header, and the LUN is described in the header.

The router 62 executes routing of a communication (task, command, data, or query), which has been received from the host 2, to the destination LU 67, based on the LUN included in the communication. In addition, the router 62 transmits communications, which are to be transmitted from plural LUs 67 to the host 2, to the target port 61 in a proper order, for example, by time division. The router 62 is realized by, for example, the CPU 42, ROM 43 and register 46. Specifically, the router 62 is realized by the program in the ROM 43 being executed by the CPU 42 with reference to the values in the register 46.

The device level manager 63 manages the operation and configuration of the device level. The management of the device level includes, for example, power management of the memory device 1, control of sleep, etc. The configuration of the device level includes, for example, retention of a set of descriptors. The device level manager 63 processes a command from the host 2, such as a change of configuration information of the memory device 1 or a query request that is an output request. The device level manager 63 is realized by, for example, the CPU 42, ROM 43 and register 46. Specifically, the device level manager 63 is realized by the program in the ROM 43 being executed by the CPU 42 with reference to the values in the register 46.

The descriptor 64, attribute 65 and flag 66 are realized, for example, as data in the work RAM 45. The descriptor 64 has a data structure of a pre-defined format, and describes a certain feature of the memory device 1. The descriptor 64 includes, for example, a device class, sub-class and protocol, which are necessary for accessing the memory device 1. The attribute 65 is a variable parameter or a read-only parameter, which is indicative of setting given to the memory device 1. The attribute 65 includes, for example, a maximum value of data which can be transferred between the memory device 1 and the host 2. The flag 66 includes a selective logical value for various items. For example, the flag 66 may be represent "true" or "false", or "0" or "1".

Each of the LUs 67 is realized by, for example, the memory 11, memory interface 34, buffer 35, ECC circuit 36, CPU 42, ROM 43 and register 46. Each LU 67 independently performs processing requested by the host 2. Accordingly, each LU is realized by part of resources provided by the memory 11, interface 31, buffer 35, ECC circuit 36, CPU 42, ROM 43 and register 46. As described above, the respective LUs are mutually distinguished one from another by the host 2, as described above by LUNs each identifying one LU. The command from the host 2 is executed by the designated LU 67.

Each LU 67 includes a device server 71, a task manager 72 and a memory area 73. The memory area 73 includes part of the memory area of the memory 11, and actually stores write data from the host 2. The device server 71 and task manager 72 are realized by, for example, the CPU 42, ROM 43 and register 46. Specifically, the device server 71 and task manager 72 are realized by the program in the ROM 43 being executed by the CPU 42 with reference to the values in the register 46. The device server 71 interprets and executes a command requesting a process of the LU level, which has been received from the host 2. Such a process includes, for example, data write, read, or erase. Since the LU 67 includes the memory area 73, the device server 71 has a function of controlling at least the memory area 73 (memory 11). The task manager 72 controls the order of execution of a plurality of commands (tasks), and provides a task management function.

As described above, the device server 71 executes a process relating to the control of the memory 11. Such a process includes conversion between a logical address and a physical address. The logical address is an address which is allocated by the host 2 to data which the host 2 desires to write in the memory device 1. The physical address, as described above, is an address for specifying a write area (page) or an erase area (block) of the memory 11. The device server 71 manages the state of storage of data by the memory area 73 corresponding to the device server 71 itself. The management of the storage state includes managing a relationship between a physical address of a page (or a physical block) and a logical address of data which is stored in this page, and managing which physical address is indicative of a page (or a physical block) that is in an erase state (a state in which no data is written or invalid data is stored). For this management, the device server 71 stores, for example, a logical address/physical address conversion table (hereinafter referred to simply as "conversion table" in some cases).

For example, as shown in FIG. 7, in an example of conversion, allocation may be made to blocks. A fixed logical address offset is allocated to each page of each block. FIG. 7 illustrates an example in which the size of a write unit of the memory 11 is 16 KB, and a logical address is allocated to each data of 512-Byte size.

<Re: Logical Unit LU 67 at Time of Communication>

Figure 8:
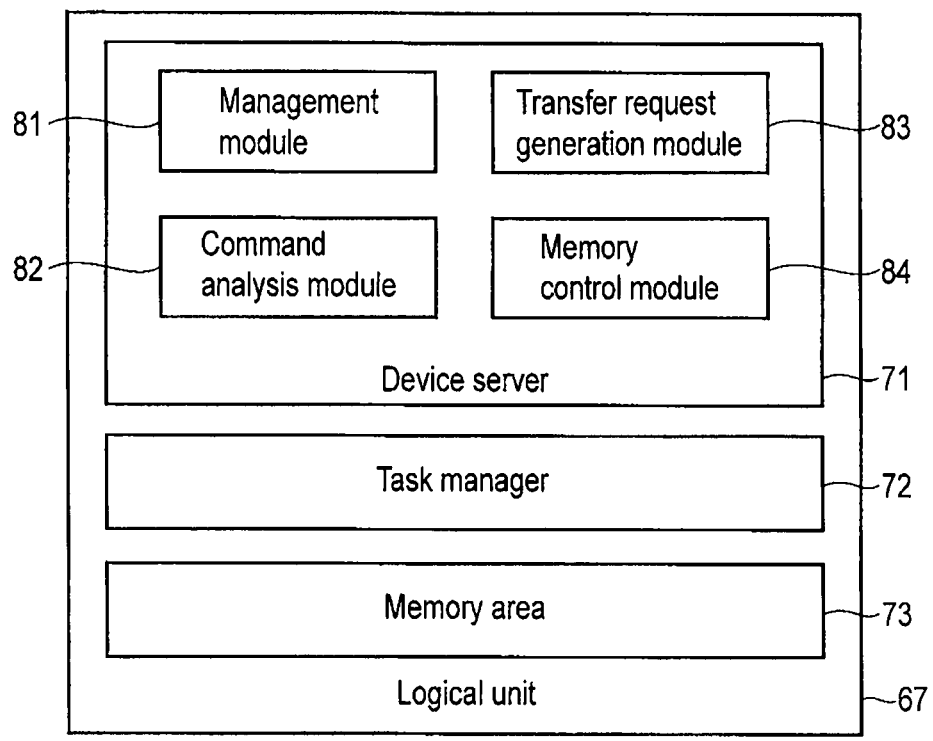
FIG. 8 is a functional block diagram showing an LU (logical unit) in greater detail according to the first embodiment.

Next, referring to FIG. 8, the LU 67 at a time of communication is described. FIG. 8 is a functional block diagram which illustrates the details of the logical unit LU at a time of communication in the first embodiment. Of the plural LUs 67, at least one LU, typically all LUs, have the structure which will be described with reference to FIG. 8.

As shown in FIG. 8, the device server 71 includes a management module 81, a command analysis module 82, a transfer request generation module 83 and a memory control module 84.

The management module 81 manages the entirety of the device server 71. The command analysis module 82 receives a command from the host 2 via the router 62. The command analysis module 82 analyzes the received command. When the command analysis module 82 has received a write command, the command analysis module 82 requests the transfer request generation module 83 to determine (generate) a transfer request. The request to the transfer request generation module 83 may be executed directly by the command analysis module 82, or may be executed by the management module 81. Upon receiving the request, the transfer request generation module 83 generates a transfer request, based on the size and address of the write data included in the write command. The memory control module 84 functions to issue any kind of instruction to the memory 11, according to the instruction by the management module 81.

<Re: Boot Operation>

Next, referring to FIG. 9, a boot (Boot) operation according to the first embodiment is described.

At shown in FIG. 9, in step St1, the host 2 first issues a query request (Query Request UPIU) to the device 1, and requests information (Descriptor) for boot from the device 1.

Then, in step St1.1, the device 1 reads out the information (Descriptor) (READ DESCRIPTOR), and sends the read-out descriptor ((Descriptor) to the host 2 via the UPIU. At this time, the information (Descriptor) that is sent is included in the substantive part 103 together with the LUN 102 in the packet 101.

Subsequently, in step St2, the host 2 requests the device 1 to read out a boot code (SCSI READ (Boot LU)).

Then, in step St2.1, the device 1 reads out the boot code and sends the read-out boot code to the host 2. At this time, too, the information (boot code) that is sent is included in the substantive part 103 together with the LUN 102 in the packet 101.

Subsequently, in step St2.2, after sending all boot codes, the device 1 transmits a status signal to the host 2. Similarly, the status signal that is sent is included in the substantive part 103 together with the LUN 102 in the packet 101.

The host 2, which has received the status signal, completes the read-out of the boot codes.

Then, in step St3, the host 2 issues a query request (Query Request) to the device 1, and instructs the start of initialization. AL this time, the host 2 sets bDeviceInit='1' as a flag value via the UPIU.

The device 1, which has received the query request, starts the initialization of the device 1.

Then, in step St3.1, if the initialization of the device 1 is completed, the device 1 returns a query response (Query Response) to the host 2, indicating a state in which the initialization can be completed.

As described above, in the present embodiment, when the initialization of the device 1 is completed, the device 1 returns the query response. The host 2 does not inquire, via the UPIU, whether the initialization of the device 1 is completed or not, by issuing a query request (Query request) to the device 1. Thus, unlike the reference example, there is not need to wait, by executing polling, to detect whether the initialization of the device has been completed or not (polling of bDeviceInit='1' as a flag value). Therefore, the host 2 does not need to allocate resources for the monitoring of the device 1, while executing the polling.

In other words, in the first embodiment, the host 2 executes polling until completion of the initialization of the device 1. However, since the device 1 does not return a query response until the completion of the initialization, the host 2 does not inquire of the device 1 about the completion of the initialization. Thus, the host 2 does not need to frequently execute polling until the return of the query response which is issued by the device 1 after the completion of the initialization, and there is a merit that only one-time confirmation is needed.

In addition, when the host 2 issues a first inquiry after the return of the query response, the completion of initialization has already been determined. Thus, there is an advantage that the only one-time inquiry is exactly needed. Furthermore, there is an advantage that no compatibility is lost with a general-purpose host with implementation unknown.

Subsequently, in step St4, the host 2 issues to the device 1 a query request for acquiring a flag value (bDeviceInit='0').

In response, in step St4.1, the device 1 returns a query response to the host 2, and returns a flag value (bDeviceInit='0'). At this time, too, the flag value (bDeviceInit='0') that is sent is included in the substantive part 103 together with the LUN 102 in the packet 101. In this case, in order to initialize the entirety of the device 1, the flag value (bDeviceInit='0') is sent simultaneously to all LUNs 102.

The host 2, which has received the query response, can detect, by the flag value (bDeviceInit='0'), that the initialization of the device 1 has been completed.

<Advantageous Effects>

According to the first embodiment, at least the following advantageous effect (1) can be obtained.

(1) The load during polling can be reduced.

As described above, in the first embodiment, the query response is not returned until the initialization of the device 1 is completed. The device 1 returns the query response when the initialization of the device 1 is completed. Thus, the host 2 does not inquire, via the UPIU, whether the initialization of the device 1 is completed or not, by issuing a query request (Query request) to the device 1.

Hence, unlike the reference example, the host 2 does not need to wait, by executing polling, to detect whether the initialization of the device has been completed or not (polling of bDeviceInit='1' as a flag value). Therefore, the host 2 does not need to allocate resources for the monitoring of the device 1. Thereby, the host 2 can dedicate itself to its own processing, leading to a decrease in boot time. In addition, since the function of polling can be omitted, functions therefor can be reduced (e.g. reduction in amount of codes, reduction in power consumption, etc.)

To be more specific, in the first embodiment, the host 2 sends the query request for requesting the initialization. Upon receiving the query response to the query request, the host 2 issues only once the query request for confirming the completion of the initialization. Thereby, the host 2 can recognize whether the initialization of the device 1 has been completed.

Thus, simply by issuing only once the query request for polling, the host 2 can recognize the end of the initialization of the device 1. Thereby, since the device 1 does not need to execute a command process from the host 2 during the initialization, the functions for processing the command of the host 2 during the initialization can be reduced (e.g. reduction in amount of codes, reduction in power consumption, etc.).

As has been described above, the first embodiment is advantageous in that in the boot operation, the load during polling of each of the memory device 1 and host device 2 can be reduced.

Moreover, when the host 2 issues a first inquiry after the return of the query response, the completion of initialization has already been determined. Thus, there is an advantage that the only one-time inquiry is exactly needed.

Besides, there is an advantage that no compatibility is lost with a general-purpose host with implementation unknown.

Second Embodiment

Next, a second embodiment is described with reference to FIG. 10. The second embodiment relates to the case in which the host 2 recognizes that the device 1 first returns a query response after the completion of initialization. A detailed description of parts common to those in the first embodiment is omitted.

<Re: Boot Operation>

Referring to FIG. 10, a boot (Boot) operation according to the second embodiment is described.

At shown in FIG. 10, in the second embodiment, in step St1, the host 2 first issues a query request (Query Request UPIU) to the device 1, and requests information (Descriptor) for boot from the device 1.

Then, in step St1.1, the device 1 reads out the information (Descriptor) (READ DESCRIPTOR), and sends the read-out descriptor ((Descriptor) to the host 2 via the UPIU. At this time, the information (Descriptor) that is sent is included in the substantive part 103 together with the LUN 102 in the packet 101.

Subsequently, the host 2 reads the presence/absence of a flag in the received device information (Device Descriptor) from the device 1, thereby determining that the polling operation is needless. In this respect, the second embodiment differs from the above-described first embodiment. Therefore, the steps St4 and St4.1 in the first embodiment can further be omitted.

The other structures and operations are substantially the same as in the first embodiment, so a detailed description thereof is omitted here.

<Advantageous Effects>

According to the second embodiment, at least the same advantageous effect (1) as described above can be obtained.

Furthermore, in the second embodiment, the host 2 reads the presence/absence of a flag in the received information (Device Descriptor) from the device 1, which is requested in step St1, thereby determining that the polling operation is needless. In this respect, the second embodiment differs from the above-described first embodiment.

Therefore, the second embodiment is advantageous in that the steps St4 and St4.1 in the first embodiment can further be omitted and the load in the boot operation of the memory device 1 and host device 2 can be reduced.

The present embodiment is applicable where necessary.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
    a nonvolatile memory including a plurality of memory cells; and
    a controller configured to control the nonvolatile memory,
    the controller being configured such that at a time of a boot operation, when a request for initialization of the memory device is issued, the controller does not return a response to the request until completion of the initialization, and the controller returns a response to the request when the initialization is completed, and
    in response to a request from a host device to write, in the memory, write data to which logical addresses are allocated, the controller requests the host device to transmit a write data part, which is a divided part of the write data, with a size of the write data part being designated,
    wherein the memory device incorporates a flag value of a substantive part, which is sent together with an address in a response packet, into a response which is returned when a request for information for boot has been issued from the host device, and
    when the host device reads presence/absence of the flag value and determines that a polling operation is needless, the memory device does not indicate to the host device a status as to whether the initialization is completed or not.

2. The device of claim 1, wherein the flag value is included in the response which is returned when the initialization is completed.

3. The device of claim 2, wherein the flag value in the substantive part is transmitted batchwise to all addresses of the nonvolatile memory included in the memory device.

4. The device of claim 1, wherein the memory device is a memory device based on Universal Flash Storage ("UFS").

5. A host device, the host device being configured such that at a time of a boot operation, when the host device has issued a request for initialization of a memory device by reading device information which the host device has requested from the memory device, the host device determines that the initialization of the memory device is completed, at a stage when the host device has received a response to the request from the memory device, and
    the host device requests the memory device to execute write of write data to which logical addresses are allocated, and the host device is requested by the memory device to transmit a write data part, which is a divided part of the write data, with a size of the write data part being designated,
    wherein the memory device incorporates a flag value of a substantive part, which is sent together with an address in a response packet, into a response which is returned when a request for information for boot has been issued from the host device,
    the host device determines whether a polling operation is needless or not, by reading presence/absence of the flag value, and
    the host device does not inquire of the memory device as to whether the initialization of the memory device is completed or not, in a case where the host device determines that the polling operation is needless.

6. The device of claim 5, wherein the flag value is included in the response which is returned when the initialization is completed.

7. The device of claim 6, wherein the flag value in the substantive part is transmitted batchwise to all addresses of the nonvolatile memory included in the memory device.

8. The device of claim 5, wherein the memory device is a memory device based on Universal Flash Storage ("UFS").

* * * * *